United States Patent
Hans et al.

(10) Patent No.: US 11,408,580 B2
(45) Date of Patent: Aug. 9, 2022

(54) LIGHT MODULE, IN PARTICULAR FOR USE IN A LIGHTING DEVICE FOR A MOTOR VEHICLE

(71) Applicant: VOLKSWAGEN AKTIENGESELLSCHAFT, Wolfsburg (DE)

(72) Inventors: Sebastian Hans, Wolfsburg (DE); Christian Studeny, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/277,851

(22) PCT Filed: Sep. 17, 2019

(86) PCT No.: PCT/EP2019/074788
§ 371 (c)(1),
(2) Date: Mar. 19, 2021

(87) PCT Pub. No.: WO2020/058236
PCT Pub. Date: Mar. 26, 2020

(65) Prior Publication Data
US 2021/0348737 A1 Nov. 11, 2021

(30) Foreign Application Priority Data

Sep. 19, 2018 (DE) .................... 10 2018 215 988.2

(51) Int. Cl.
*F21S 43/40* (2018.01)
*F21S 43/249* (2018.01)
(Continued)

(52) U.S. Cl.
CPC ............... *F21S 43/40* (2018.01); *F21S 43/14* (2018.01); *F21S 43/15* (2018.01); *F21S 43/19* (2018.01);
(Continued)

(58) Field of Classification Search
CPC .................................................... F21S 43/245
See application file for complete search history.

(56) References Cited

U.S. PATENT DOCUMENTS 5,150,960 A * 9/1992 Redick .................... B60Q 1/56
362/604
6,428,175 B1 8/2002 Willing
(Continued)

FOREIGN PATENT DOCUMENTS

DE 19860697 A1 8/2000
DE 19902774 A1 8/2000
(Continued)

*Primary Examiner* — Eric T Eide
(74) *Attorney, Agent, or Firm* — Laurence A. Greenberg; Werner H. Stemer; Ralph E. Locher (57) ABSTRACT

A light module is particularly suited for use in a lighting device for a motor vehicle. The light module has at least one extensive light body and at least one illuminant, the light rays of which are able to exit, or exit, to the outer side via a light-exit area that is surrounded by side areas of the light body. At least one part of the side areas and a back area lying opposite the light-exit area are covered by a reflective or diffusely back-scattering cover. The cover is formed by a frame-like component with a back wall. A side wall of the frame-like component has an opening. The light body is able to be laterally slid into, or is laterally slid into, the frame-like component through the opening. The at least one illuminant is disposed on the side wall with the opening of the frame-like component.

9 Claims, 5 Drawing Sheets

(51) Int. Cl.
  *F21S 43/14* (2018.01)
  *F21S 43/19* (2018.01)
  *F21S 43/239* (2018.01)
  *F21S 43/15* (2018.01)
  *F21V 8/00* (2006.01)

(52) U.S. Cl.
  CPC .......... *F21S 43/239* (2018.01); *F21S 43/249* (2018.01); *G02B 6/0041* (2013.01)

(56) References Cited

U.S. PATENT DOCUMENTS

| | | | |
|---|---|---|---|
| 7,688,401 | B2 | 3/2010 | Schellhorn et al. |
| 8,740,427 | B2 | 6/2014 | Fritz et al. |
| 10,744,945 | B2 | 8/2020 | Oh et al. |
| 2005/0195620 | A1 | 9/2005 | Hwang et al. |
| 2008/0186726 | A1* | 8/2008 | Okada ................ B60Q 1/0041 362/509 |
| 2008/0291356 | A1 | 11/2008 | Kim |
| 2008/0297695 | A1 | 12/2008 | Sekiguchi et al. |
| 2009/0167988 | A1 | 7/2009 | Sung |
| 2011/0216549 | A1 | 9/2011 | Futami |
| 2011/0280045 | A1 | 11/2011 | Baek et al. |
| 2012/0257107 | A1 | 10/2012 | Itoh |
| 2013/0336004 | A1 | 12/2013 | Mulder et al. |
| 2018/0029529 | A1 | 2/2018 | Iseki et al. |
| 2019/0170317 | A1* | 6/2019 | Gloss .................... F21S 43/245 |
| 2020/0241197 | A1* | 7/2020 | Shin ......................... B60Q 1/02 |
| 2020/0256539 | A1* | 8/2020 | Gloss ...................... F21S 43/26 |
| 2021/0041078 | A1* | 2/2021 | Park ....................... F21S 43/26 |

FOREIGN PATENT DOCUMENTS

| | | |
|---|---|---|
| DE | 102011110629 A1 | 2/2013 |
| DE | 102011110630 A1 | 2/2013 |
| DE | 102014110225 A1 | 1/2016 |
| DE | 112016000952 T5 | 11/2017 |
| EP | 1391755 A2 | 2/2004 |
| EP | 2428724 A1 | 3/2012 |
| EP | 3211298 A1 | 8/2017 |
| GB | 2544896 A | 5/2017 |
| JP | 2013058396 A | 3/2013 |
| WO | 2015075668 A1 | 5/2015 |
| WO | 2017213484 A1 | 12/2017 |

* cited by examiner

LIGHT MODULE, IN PARTICULAR FOR USE IN A LIGHTING DEVICE FOR A MOTOR VEHICLE

BACKGROUND OF THE INVENTION

Field of the Invention

The invention relates to a light module, in particular for use in an illumination apparatus for a motor vehicle, having at least one two-dimensional light body and at least one light-emitting means, whose light beams are able to be coupled or are coupled into a side face of the light body. The light beams can exit or do exit to the outside via a light exit face that is surrounded by side faces of the light body and at least a part of the side faces and a rear-side face located opposite the light exit face are covered by a reflective or diffusely back-scattering covering.

Such a light module is known from DE 198 60 697 A1. In specific terms, the light module has an optical waveguide with a light exit face. A light-reflective or diffusely back-scattering film is arranged on the surface of the light module lying opposite the light exit face and on the side faces of the optical waveguide that connect the light exit face and the opposite surface. Furthermore, a light source for laterally coupling in light is present at one of the side faces. On the light exit face of the optical waveguide, the surface is provided with faces that are light-scattering and planar in alternation. The area ratio of the planar faces to the light-scattering faces is selected in dependence on the luminance at the respective location of the optical waveguide. The application of the reflective film is combined practically with the production of the optical waveguide, which is produced by injection molding. During the production, the injection mold is previously lined with the film on the bottom face and at least part of the side face. During hardening after the injection molding of the plastic, the film adheres to the optical waveguide.

In DE 199 02 774 A1, a light-emitting body having light-emitting diodes for backlighting information elements is described. The light-emitting diodes serve for introducing light into the interior of a hollow body, which has a light-emitting face for backlighting the information elements. Opposite the light-emitting face, a rear wall is formed, which is likewise embodied to be light-emitting, self-luminous, or merely opaque. Both faces are connected to each other by opaque or diffusely reflective side walls. The side walls have light entry openings, in which light-emitting diodes or ends of light guides are arranged such that they can couple their light completely into the hollow space. The opaque wall of the side faces consists of a material that reflects with a high reflectance. The light exit face and the opposite face consist of light-scattering material having a low absorptance.

It should furthermore be mentioned that, when producing motor vehicle illumination apparatuses, the use of two-dimensional OLED light-emitting means (OLED=organic light-emitting diode) is frequently also considered for space reasons and for attaining specific optical effects. However, OLED light-emitting means are expensive and have disadvantages in terms of their aging resistance and robustness owing to their organic structure.

SUMMARY OF THE INTENTION

The present invention is therefore based on the object of providing a light module with which an OLED light-emitting means can be optically simulated and which has a simple and cost-effective construction.

The above object is achieved by a light module having the features as claimed. Advantageous embodiments and developments of the invention are evident from the dependent claims.

The invention proceeds from a light module having at least one two-dimensional light body and at least one light-emitting means, the light beams of which are able to be coupled or are coupled into a side face of the light body, that is to say laterally. The coupled-in light beams can exit or do exit to the outside via a light exit face surrounded by side faces of the light body. At least a part of the side faces and a rear-side face located opposite the light exit face are covered by a reflective or diffusely back-scattering covering.

Two-dimensional within the meaning of the invention is intended to mean that the light body has an area extent in two mutually perpendicular directions, which is multiple times a thickness of the light guide in each direction.

The light-emitting means can be a monochrome LED (LED=light-emitting diode), that is to say a single-colored LED, or an RGB LED for emitting light of any colors.

The invention now proposes that the covering is formed by a frame-type component having a rear wall. A side wall of the frame-type component here has an opening through which the light body can be brought or is brought laterally into the frame-type component. The at least one light-emitting means is arranged at the side wall of the frame-type component exhibiting the opening.

In this way, the two-dimensionality and the homogeneity of an OLED light-emitting means can be simulated, and such a light module is additionally very easy and cheap to produce. The use of additional films, as can be found in the prior art, can be dispensed with.

According to a first development of the invention, light-scattering defects are arranged distributed in the light body. In this way, a specific scattering of the light beams that have been coupled into the light body can be achieved, which results in an improvement of a homogeneous light emission by the light module. Owing to the fact that the light-scattering defects are arranged distributed in the entire light body rather than just at the surface thereof, the light-scattering properties of the light body are able to be maintained for a long time even in everyday operation of the light module, for example when used in a motor vehicle illumination apparatus.

To achieve particularly good homogeneity of the light emission, it has proven advantageous if the light body has a transmittance in a range of approximately 85 percent to approximately 95 percent. The light body thus has only a slightly scattering effect when light is coupled in. With particular preference, the light body has a transmittance of approximately 92 percent.

According to another refinement of the inventive concept, the at least one light-emitting means is arranged at a distance from the side wall of the frame-type component, in other words including at a distance from the side face of the light body that couples light in. The distance preferably ranges from approximately 9 millimeters to approximately 11 millimeters, preferably has a value of approximately 10 millimeters. It is also possible to thereby contribute to a homogeneous light emission of the light module.

To bring about a light yield and effectivity of the light module that are as high as possible, it is proposed that at least one converging optical unit or collimation optical unit is arranged between the at least one light-emitting means and the side wall of the frame-type component. For example, when using light-emitting diodes, which are known to have an opening angle of their light emission of up to 180 degrees, light beams that exit in lateral regions can thus also be "caught".

Another development of the invention proposes that the frame-type component is attached to a printed circuit board via a holder, which also carries the at least one light-emitting means. This development helps make the light module easier to mount.

In this case it is highly expedient if the frame-type component is latched to the holder. In this way, the ability to mount the light module or to remove it is optimized.

According to another refinement, the light module has a plurality of light-emitting means in the form of light-emitting diodes, which have a spacing of more than 4.5 millimeters and less than 6.5 millimeters between them. This contributes to a homogeneity in the light distribution in the light body and thus ultimately to a homogeneous light emission of the light module. With particular preference, the spacing between the light-emitting diodes is approximately 5 millimeters.

Under certain circumstances it may be desirable to arrange a plurality of such light modules next to one another in an illumination apparatus. In that case, it makes sense for the purposes of easier mounting of the illumination apparatus to provide a light unit that has a plurality of light modules according to the invention. In the case of such a light unit, the frame-type components and also the two-dimensional light bodies are in each case connected to one another to form one piece. Furthermore, the frame-type components are attached to such a common printed circuit board that also carries the light-emitting means assigned to the two-dimensional light bodies.

The present invention is also intended to serve to protect an illumination apparatus for a motor vehicle that has at least one light module according to the invention or at least one light unit according to the invention.

Finally, protection is sought also for a motor vehicle that is provided with at least one such illumination apparatus.

Preferred exemplary embodiments of the invention are illustrated in the figures and will be explained in more detail in the following description with reference to the figures. Even further advantages of the invention will become evident in the process. Identical reference signs, even in different figures, relate to identical, comparable, or functionally identical components. Corresponding or comparable properties and advantages are achieved here even if a description or reference thereto is not repeated. The figures are not, or at least not always, to scale. In some figures, proportions or distances can be illustrated in an exaggerated fashion so as to make features of an exemplary embodiment stand out more.

DETAILED DESCRIPTION OF THE INVENTION

Figure 1:
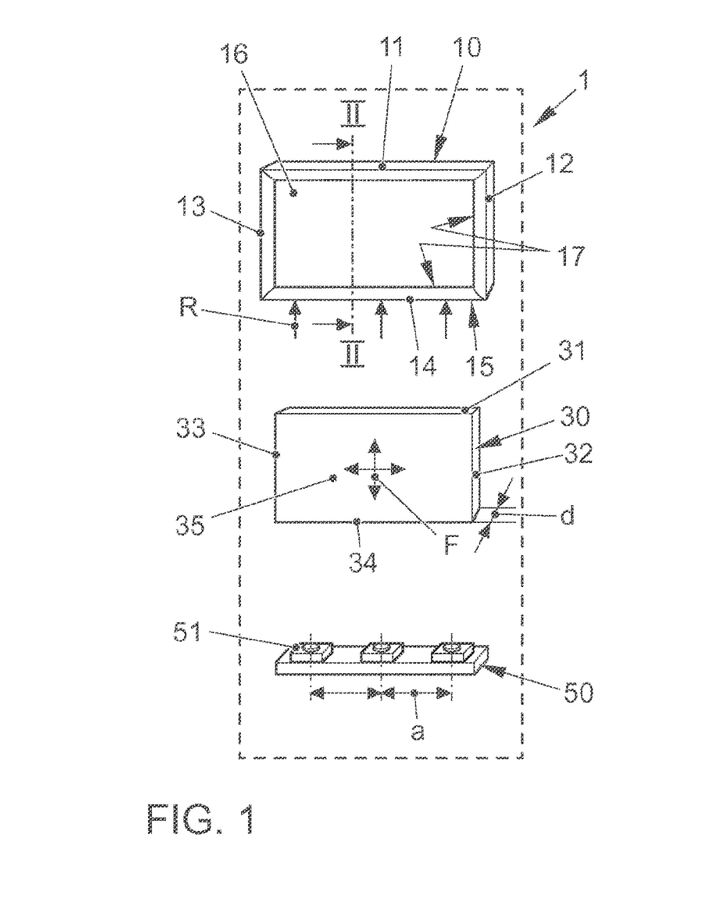
FIG. 1 shows an exploded view of a light module.
Figure 2:
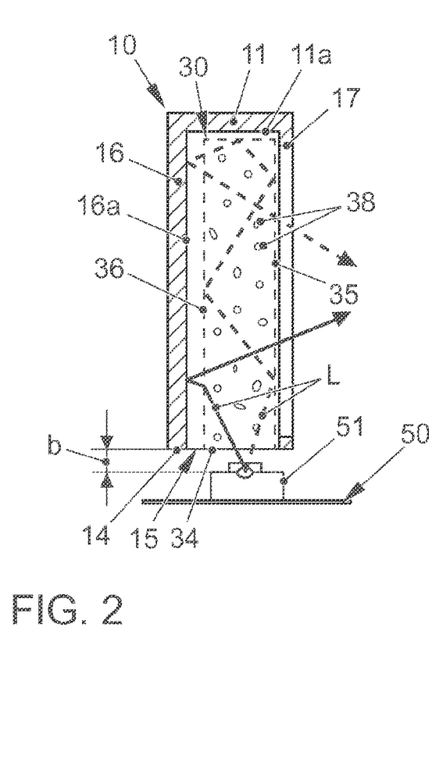
FIG. 2 shows a sectional illustration along the section line II from FIG. 1.

Reference is first made to FIGS. 1 and 2. The figures show an exploded view of a light module 1, which comprises a frame-type component 10, held therein a two-dimensional light body 30, and a printed circuit board 50 with light-emitting means 51.

The frame-type component 10 has a rectangular outline, formed by side walls 11, 12, 13 and 14. The side walls 11 to 14 are connected by a rear wall 16 in one piece. An opening 17, which preferably nearly corresponds to the outline of the component 10, is present opposite the rear wall 16.

The side wall that is the lower side wall 14 in the figure has an opening 15 that has a rectangular outline. The two-dimensional light body 30 can be slid through the opening 15 into the frame-type component 10 in an insertion direction R. Inside, the component 10 can additionally have guiding and/or holding means (not illustrated in more detail) for the light body 30.

The light body 30 has, like the component 10, a rectangular outline and has a two-dimensional design. It has an area extent F, which is multiple times its thickness d in every direction.

The dimensions of the light body 30 are such that it substantially fills the frame-type component 10 in its mounted position.

The light body 30 has side faces 31, 32, 33 and 34. These side faces surround a light exit face 35. The light exit fact 35 lies opposite a rear-side face 36. The dimensions of the frame-type component 10 and of the light body 30 are preferably chosen such that the light body 30 is securely held therein after the component 10 has been slid in. Alternatively, a latching mechanism (not illustrated in more detail) is also conceivable.

The light body 30 is embodied in the form of a light guide and preferably has a transmittance in a range from approximately 85 percent to approximately 95 percent. The transmittance is with particular preference approximately 92 percent.

The only slight scatter property of the light body 30 is caused by light-scattering defects 38, which are arranged distributed in the light body 30. The light-scattering defects 38 can have been introduced into the light body 30 during the production in the form of disturbing particles. It is alternatively also conceivable to introduce the light-scattering defects into the light body 30 via laser processing.

The frame-type component 10 is embodied to be reflective or diffusely back-scattering on the inside. For this purpose, an interior surface 16a of the rear wall 16 can be embodied to be reflective or diffusely scattering. This can be implemented for example by way of a white or red coating. An interior surface 11a of the side wall 11 can be embodied in the same way.

The color of the outside surfaces of the frame-type component 10 is preferably opaque. For example, it may be black. Other colors are conceivable.

The printed circuit board 50 already mentioned having the light-emitting means 51, which are in the form of light-emitting diodes (LEDs), is arranged at a close distance b below the side wall 14. The distance b is preferably approximately 10 millimeters. It is furthermore evident that the light-emitting means 51 have a mutual spacing a, which is preferably approximately 5 millimeters in the exemplary embodiment.

The light body 30 is preferably colored red. It can consist of, for example, PMMA (polymethylmethacrylate) or of PC (polycarbonate).

The embodiments of the component 10 and of the light body 30 result in light beams L, which are coupled into the light body 30 via the light-emitting means 51, "sticking to", or being diffusely scattered at, the light-scattering defects 38. This contributes to homogeneous full lighting of the light body 38.

Light beams L, which are incident on the interior surfaces 16a or 11a, are reflected back or are diffusely scattered back in the direction of the light body 30. This constitutes a significant contribution to the attainment of a homogeneous light emission of the light module 1. However, this effect is further optimized by said defects 38.

Figure 3:
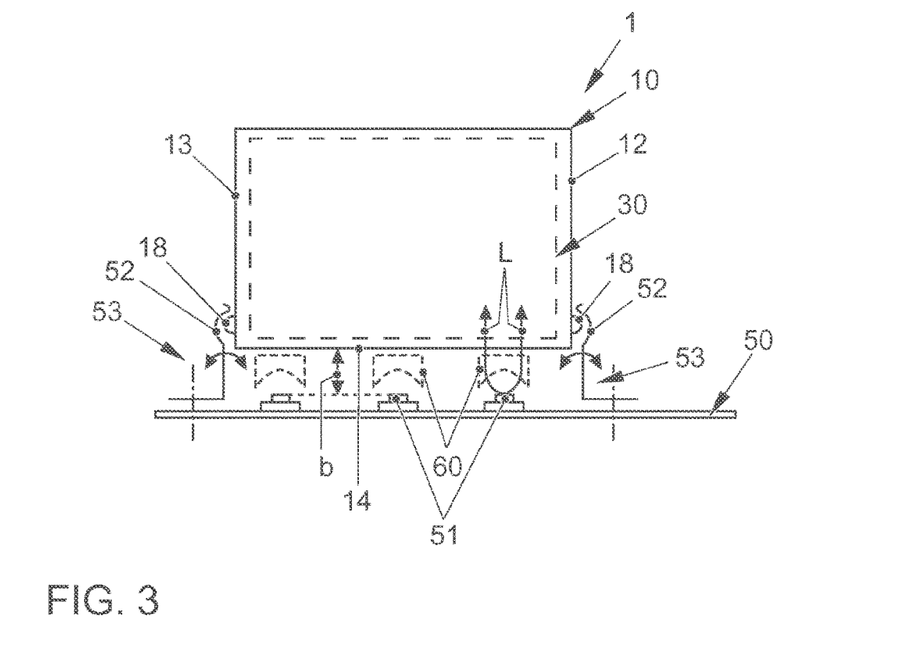
FIG. 3 shows a schematic diagram of the mounted light module.

It is then evident from FIG. 3 how the light module 1 can be preferably mounted. Angled holders 53, which are connected, preferably screw-connected or adhesively bonded, to the printed circuit board 50, are thus present on the printed circuit board 50.

The frame-type component 10 has at its opposite side walls 12, 13 in each case protruding latch means 18. The latch means 18 engage in a latching manner into counter-latch means 52 of the resiliently deflectable holders 53.

Converging optical units 60 are furthermore indicated in each case by a dashed line between the lower side wall 14 of the component 10 and the light-emitting means 51. Said converging optical units 60 are optional and contribute to light beams L emitted by the light-emitting means 51 being "gathered" and aligned in the direction of the light body 30.

Figures 4, 5:
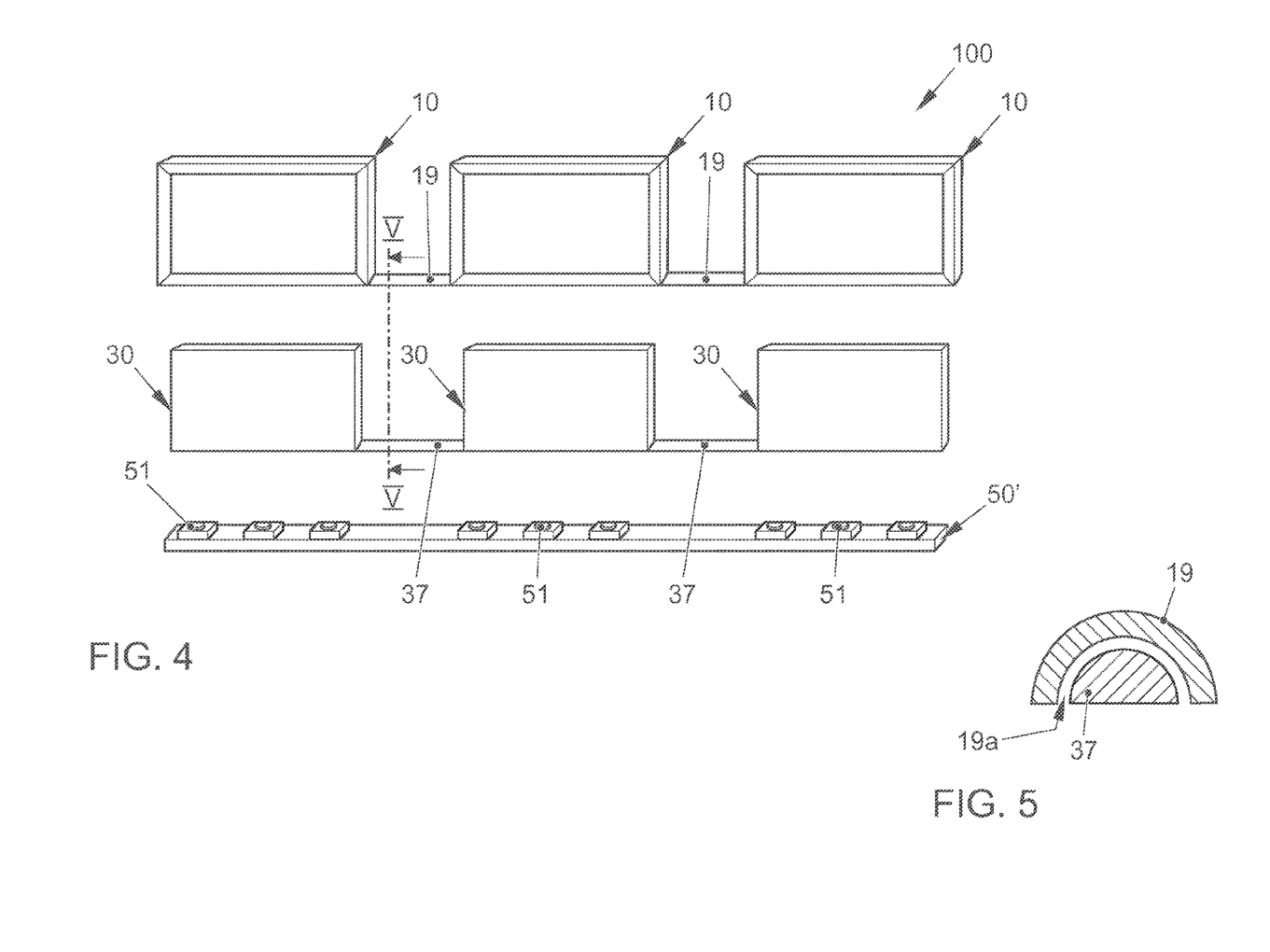
FIG. 4 shows an exploded view of a light unit consisting of three light modules.
FIG. 5 shows a sectional view along section line V from FIG. 4.

FIG. 4 shows a light unit 100 consisting of three light modules (as described).

In this way, three frame-type components 10 are present, which are connected in each case in one piece via a bar-type connection element 19. On the other side, three light bodies 30 are connected in each case in one piece via a bar-type connection element 37.

The components 10 and the light bodies 30 can thus be produced simply in one work step, preferably in each case in an injection mold tool.

To simplify mounting, the cross section of each of the connection elements 19 has a curved shape, with the result that a semicircular receiving space 19a is created. The receiving space 19a for its part serves for receiving the connection element 37, whose cross section is semicircular, during the mounting (cf. FIG. 5).

Finally, a printed circuit board 50' is present, which is accordingly embodied to be longer than the printed circuit board 50 (cf. FIG. 1) and receives a plurality of, preferably three, light-emitting means 51, which are in each case assigned to the light bodies 30.

Figure 6:
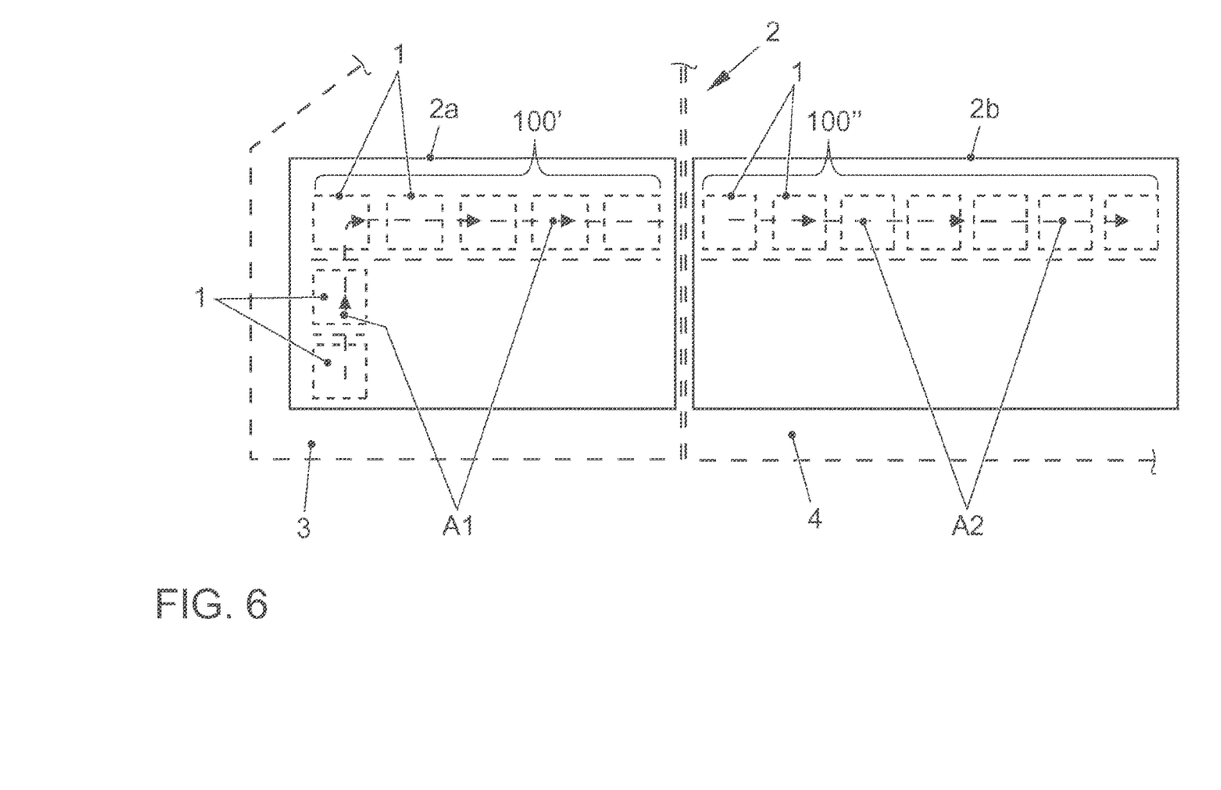
FIG. 6 shows an illustration of a taillight with light modules and light units according to the invention.

FIG. 6 illustrates that the light modules 1, or the light units 100' or 100" that consist of the light modules 1, can also be used in an illumination apparatus 2 of a motor vehicle (which is indicated by dashes). The illumination apparatus 2 can be a taillight of a motor vehicle, wherein a body-side part 2a of the illumination apparatus 2 can be fitted in a body 3 and a tailgate-side part 2b of the illumination apparatus 2 can be fitted into a tailgate 4 of a motor vehicle.

It is conceivable to control the individual light modules 1 successively via a control unit (not illustrated in more detail here) such that light-technical animations A1 or A2 (compare arrow direction) are generated. This is conceivable for example for implementing what is known as a coming-home or leaving-home function.

Figure 7:
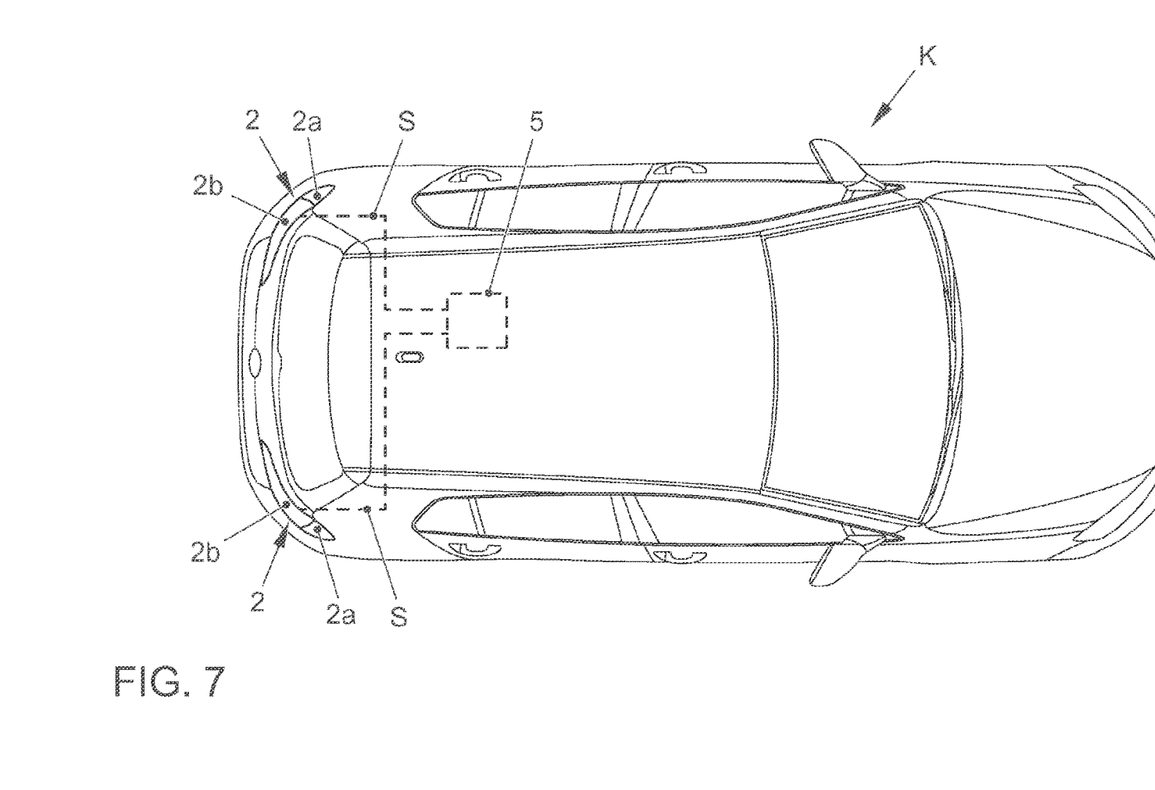
FIG. 7 shows a motor vehicle having taillights with light modules and light units according to the invention.

FIG. 7, finally, shows a motor vehicle K, in which two illumination apparatuses 2 serving as taillights are installed. A control unit 5 serves, via signal and control lines S, for controlling the illumination apparatuses 2.

LIST OF REFERENCE SIGNS

1 Light module
2 Illumination apparatus
2a Body-side part of the illumination apparatus
2b Tailgate-side part of the illumination apparatus
3 Body
4 Tailgate
5 Control unit
10 Covering, frame-type component
11 Side wall
11a Interior surface
12 Side wall
13 Side wall
14 Side wall
15 Opening
16 Rear wall
16a Interior surface
17 Opening
18 Latch means
19 Bar-type connection element
19a Receiving space
30 Two-dimensional light body
31 Side face
32 Side face
33 Side face
34 Side face
35 Light exit face
36 Rear-side face
37 Bar-type connection element
38 Light-scattering defects
50, 50' Printed circuit board
51 Light-emitting means, LEDs
52 Counter-latch means
53 Holder
60 Converging optical unit
100, 100', 100" Light units
a Spacing
A1, A2 Animations
b Distance
d Thickness
F Area extent
L Light beams
R Insertion direction
S Signal and control line

The invention claimed is:

1. An illumination apparatus for a motor vehicle, comprising
   a light module comprising,
      at least one light body having side faces, said light body having side faces, a light exit face surrounded by said side faces, and a rear-side face opposite said light exit face, said light exit face of said light body having a given area extent;
      at least one light-emitting light source configured to generate light beams to be coupled into a side face of said light body and to exit outwardly via said light exit face of said light body;

a reflective or diffusely back-scattering covering disposed to cover at least a part of said side faces and said rear-side face opposite said light exit face;

said covering being a frame component with a rear wall, a front wall opening, and a side wall, said side wall being formed with an opening configured to receive said light body therethrough for lateral insertion into said frame component and said front wall opening having opening dimensions smaller than said given area extent, with said frame component retaining the light body after the lateral insertion through said opening in said side wall; and wherein said at least one light-emitting light source is arranged at said side wall of said frame component that is formed with said opening;

where the at least one light module is a plurality of light modules;

wherein said frame components are connected on one side and said light bodies are connected on another side in each case in one piece and wherein said frame components are attached to a common printed circuit board carrying said light-emitting light sources that are assigned to said light bodies.

2. The light module according to claim 1, wherein said light body contains light-scattering defects distributed in said light body.

3. The light module according to claim 2, wherein said light body has a transmittance in a range from approximately 85% to approximately 95%.

4. The light module according to claim 2, wherein said light body has a transmittance of approximately 92%.

5. The light module according to claim 1, wherein said at least one light-emitting light source is arranged at a distance from said side wall of said frame component.

6. The light module according to claim 1, further comprising at least one converging optical unit arranged between said at least one light-emitting light source and said side wall of said frame component.

7. The light module according to claim 1, further comprising a printed circuit board and a holder attaching said frame component to said printed circuit board that also carries said at least one light-emitting light source.

8. The light module according to claim 7, wherein said frame component is latched to said holder.

9. The light module according to claim 1, wherein said light emitting light source is one of a plurality of light-emitting diodes disposed at a mutual spacing from one another of more than 4.5 mm and less than 6.5 mm.

* * * * *